Sept. 27, 1932.   T. J. KLEIN   1,879,318
BIRD PERCH
Filed March 14, 1930

INVENTOR
THOMAS J. KLEIN
BY
ATTORNEY

Patented Sept. 27, 1932

1,879,318

UNITED STATES PATENT OFFICE

THOMAS J. KLEIN, OF CHICAGO, ILLINOIS

BIRD PERCH

Application filed March 14, 1930. Serial No. 435,797.

This invention relates to improvements in the housing of birds that are kept in households, such as canaries and the smallest species, and more particularly to perches for bird cages.

It is an object of this invention to provide an improved bird cage perch which from its form will act to automatically prevent the toe nails of the birds alighting time after time each hour of the day from growing too long and becoming an annoyance as well as an unnatural condition.

With these and other objects in view, reference is made to the accompanying sheet of drawing which illustrates preferred forms of this invention, with the understanding that minor detail changes may be made without departing from the scope thereof.

Figure 1:
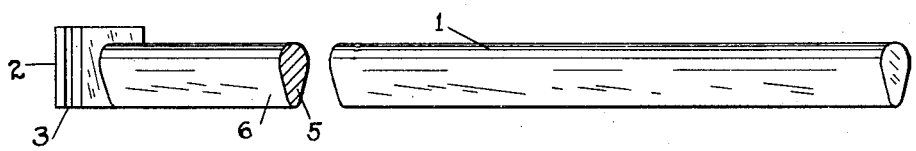
Figure 1 is a view in side elevation of one embodiment of this invention, with parts broken away and partly in section.
Figure 2:
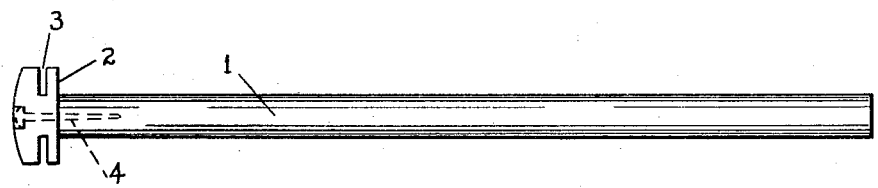
Figure 2 is a top plan view of Figure 1.

In the embodiment of this invention illustrated in Figures 1 and 2, the perch 1 is mounted upon a perch holder 2 provided with oppositely disposed vertical grooves 3 at each end and is of such width as to be received between adjacent vertical wires of the bird cage with the wires received within the grooves 3.

The perch 1 may be secured to the perch holder 2 in any desired manner, such as by screw 4. While it is preferable to form the perch of celluloid or at least provide the upper surface with a coating of celluloid, for the purposes described in the applicant's prior Patent No. 1,747,476 granted February 18, 1930, upon an application filed May 29, 1929, it is not necessary to this invention.

While said patent discloses a perch having a smooth surface provided with a longitudinal depending strip of abrasive material adapted to be contacted by the toe nails of a bird's claws when grasping the perch, it has been found that by forming a perch which is cylindrical on the upper side and provided with an integral longitudinal under portion 5, as shown in Figure 1, the opposite sides 6 of which are tangential to the curved upper surface, or are downward projections thereof, when the bird alights upon the perch the ends of its toe nails will contact with the depending portion 5 and in grasping the perch continually to maintain its balance, the ends of its toe nails will be worn away and prevented from growing long enough to be uncomfortable or unnatural.

A healthy bird in a cage hops from perch to perch many times hourly during the day and maintains its balance by grasping the body of the perch with its claws which in a cylindrical perch will wrap themselves about the perch with a firm grasp. The formation of the perch as contemplated in this invention will prevent the wrapping of the claws about it as it is of greater depth than width and the depending portion will be contacted by the ends of the toe nails so that this constant hourly intermittent rubbing of the ends of the toe nails upon the depending integral portion of the perch will prevent the nails from growing beyond the length necessary to grasp the perch to properly balance thereon.

In the applicant's said prior patent it is not necessary to trim the bird's toe nails when the patented perches are installed because the abrasive material will automatically do so. While not necessary, it is preferable to first trim the bird's toe nails the proper length before installing the perch contemplated in this invention, to make the bird more comfortable, and thereafter the particular form or shape of the perch will counteract the natural growth of the nails.

What I claim is:

A perch for a bird cage having a curved upper portion and an integral depending and downwardly tapering portion throughout its length terminating in a curved lower portion with the sides tangential to the curved upper and lower portions.

THOMAS J. KLEIN.